United States Patent
Kang et al.

(10) Patent No.: US 7,718,946 B2
(45) Date of Patent: May 18, 2010

(54) IMAGE GENERATING METHOD AND APPARATUS

(75) Inventors: Byong-min Kang, Yongin-si (KR); Do-kyoon Kim, Seongnam-si (KR); Kee-chang Lee, Yongin-si (KR); Sun-hyuck Chae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 205 days.

(21) Appl. No.: 12/149,612

(22) Filed: May 5, 2008

(65) Prior Publication Data

US 2009/0114802 A1  May 7, 2009

(30) Foreign Application Priority Data

Nov. 6, 2007   (KR) .................. 10-2007-0112748

(51) Int. Cl.
*H01L 27/00* (2006.01)
*H01J 40/14* (2006.01)

(52) U.S. Cl. ............... 250/208.1; 250/214 R; 250/226; 382/103; 382/154

(58) Field of Classification Search ............. 250/208.1, 250/214 R, 221, 222.1, 226; 382/103, 106, 382/154, 162, 321
See application file for complete search history.

(56) References Cited

U.S. PATENT DOCUMENTS

| | | | |
|---|---|---|---|
| 6,856,355 | B1 | 2/2005 | Ray et al. |
| 7,372,977 | B2 * | 5/2008 | Fujimura et al. ............ 382/103 |
| 2001/0046317 | A1 | 11/2001 | Kamon et al. |
| 2003/0156756 | A1 * | 8/2003 | Gokturk et al. ............. 382/190 |
| 2005/0031166 | A1 | 2/2005 | Fujimura et al. |

OTHER PUBLICATIONS

European Search Report for corresponding European Patent Application No. 08158220 dated Mar. 12, 2009, 5 pages (in English).

* cited by examiner

*Primary Examiner*—Kevin Pyo
(74) *Attorney, Agent, or Firm*—Staas & Halsey LLP

(57) ABSTRACT

An image generating method and apparatus are provided. The image generating method irradiates a light with a predetermined wavelength to a target object at a predetermined interval, passes a light having a wavelength required to generate a color image from among lights reflected from the target object, detects color values according to the passed light, generates a depth image of the target object using color values detected during a period in which the light with the predetermined wavelength is irradiated, and generates the color image of the target object using color values detected during a period other than the period in which the light with the predetermined wavelength is irradiated. Accordingly, the image generating method can generate a depth image having high resolution while maintaining the resolution of the color image.

11 Claims, 6 Drawing Sheets

IMAGE GENERATING METHOD AND APPARATUS

CROSS-REFERENCE TO RELATED APPLICATIONS

This application claims the benefit of Korean Patent Application No. 10-2007-0112748, filed on Nov. 6, 2007, in the Korean Intellectual Property Office, the disclosure of which is incorporated herein in its entirety by reference.

BACKGROUND

1. Field

One or more embodiments of the present invention relate to an image generating method and apparatus and, more particularly, to an image generating method and apparatus for simultaneously generating a color image and a depth image.

2. Description of the Related Art

A 3D image sensing technique capable of acquiring color information including R, G and B values of each pixel forming an image and depth information representing depth values of the pixels in real time and providing the color information and the depth information to a user allows the user to experience visual reality and virtual environments. The 3D image sensing technique is widely used in face tracking and face recognition fields, game fields in which a user's motions are recognized, digital camera fields, control fields in which an air bag system is controlled according to the position or body size of a passenger, navigation fields and so on.

SUMMARY

One or more embodiments of the present invention provide an image generating method and apparatus for generating a depth image without deteriorating the resolution of a color image.

Additional aspects and/or advantages will be set forth in part in the description which follows and, in part, will be apparent from the description, or may be learned by practice of the invention.

According to an aspect of the present invention, an image generating method is provided including irradiating a light with a predetermined wavelength to a target object at a predetermined interval, passing a light having a wavelength required to generate a color image from among lights reflected from the target object and detecting color values according to the passed light, generating a depth image of the target object using color values detected during a period in which the light with the predetermined wavelength is irradiated, and generating the color image of the target object using color values detected during a period other than the period in which the light with the predetermined wavelength is irradiated.

According to another aspect of the present invention, a computer readable recording medium storing a program for executing the image generating method is provided.

According to another aspect of the present invention, an image generating apparatus is provided including a light irradiating unit irradiating a light with a predetermined wavelength to a target object at a predetermined interval, a color value detector passing a light having a wavelength required to generate a color image from among lights reflected from the target object and detecting color values according to the passed light, a depth image generator generating a depth image of the target object using color values detected during a period in which the light with the predetermined wavelength is irradiated, and a color image generator generating the color image of the target object using color values detected during a period other than the period in which the light with the predetermined wavelength is irradiated.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
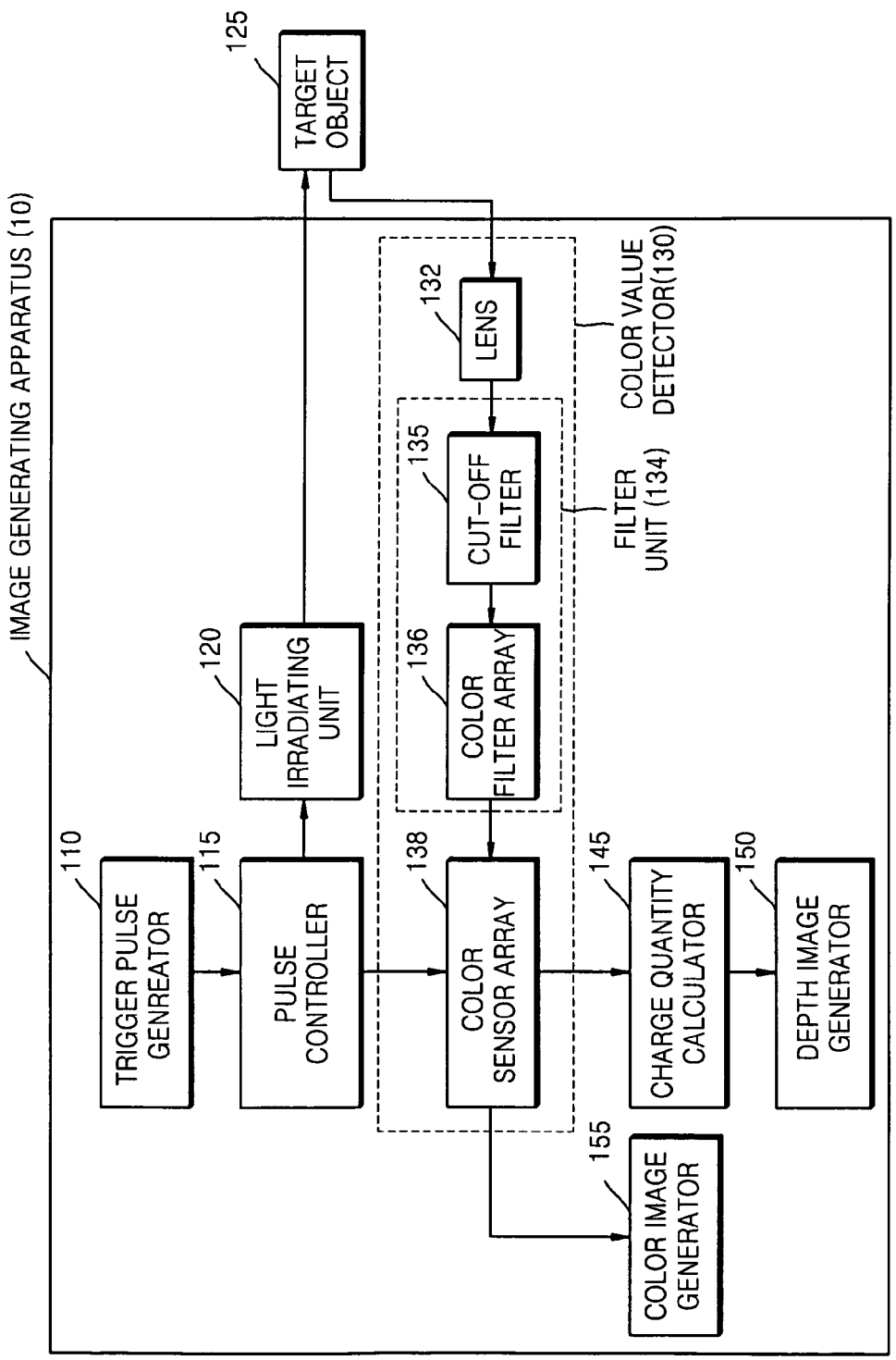
FIG. 1 illustrates an image generating apparatus, according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an image generating apparatus 10, according to an embodiment of the present invention. Referring to FIG. 1, the image generating apparatus 10 may include, for example, a trigger pulse signal generator 110, a pulse controller 115, a light irradiating unit 120, a color value detector 130, a charge amount calculator 145, a depth image generator 150, and a color image generator 155. The color value detector 130 includes a lens 132, a filter unit 134, and a color pixel array 138. The filter unit 134 includes a cut-off filter 135 and a color filter array 136.

The image generating apparatus 10 receives light from a target object 125. Here, the light is obtained in such a manner that sunlight or artificial light is reflected from the target object 125 and arrives at the image generating apparatus 10. The image generating apparatus 10 can generate a color image of the target object 125 from the received light. The image generating apparatus 10 irradiates the target object 125 with a light having a predetermined wavelength and receives a light reflected from the target object 125 so as to generate a depth image of the target object 125.

However, it is difficult to distinguish whether the light received by the image generating apparatus 10 is obtained as sunlight or artificial light is reflected from the target object 125, or as light irradiated by the image generating apparatus 10 to the target object 125 and then reflected from the target object 125. To solve this problem, the image generating apparatus 10 irradiates the light to the target object 125 only during a predetermined period so as to distinguish the light irradiated by the image generating apparatus 10 to the target object 125 and then reflected from the target object 125, from the sunlight or artificial light reflected from the target object 125 and received by the image generating apparatus 10, in the current embodiment of the present invention.

The trigger pulse signal generator 110 generates a pulse signal with a pulse repeated at a predetermined interval. A pulse width corresponding to the duration of a high level of the pulse signal can correspond to an interval of a frame of an image. The trigger pulse signal generator 110 generates a trigger pulse signal having different levels for even-numbered frames and odd-numbered frames so as to inform the pulse controller 115 whether a current frame is an even-numbered frame or an odd-numbered frame.

Figure 4:
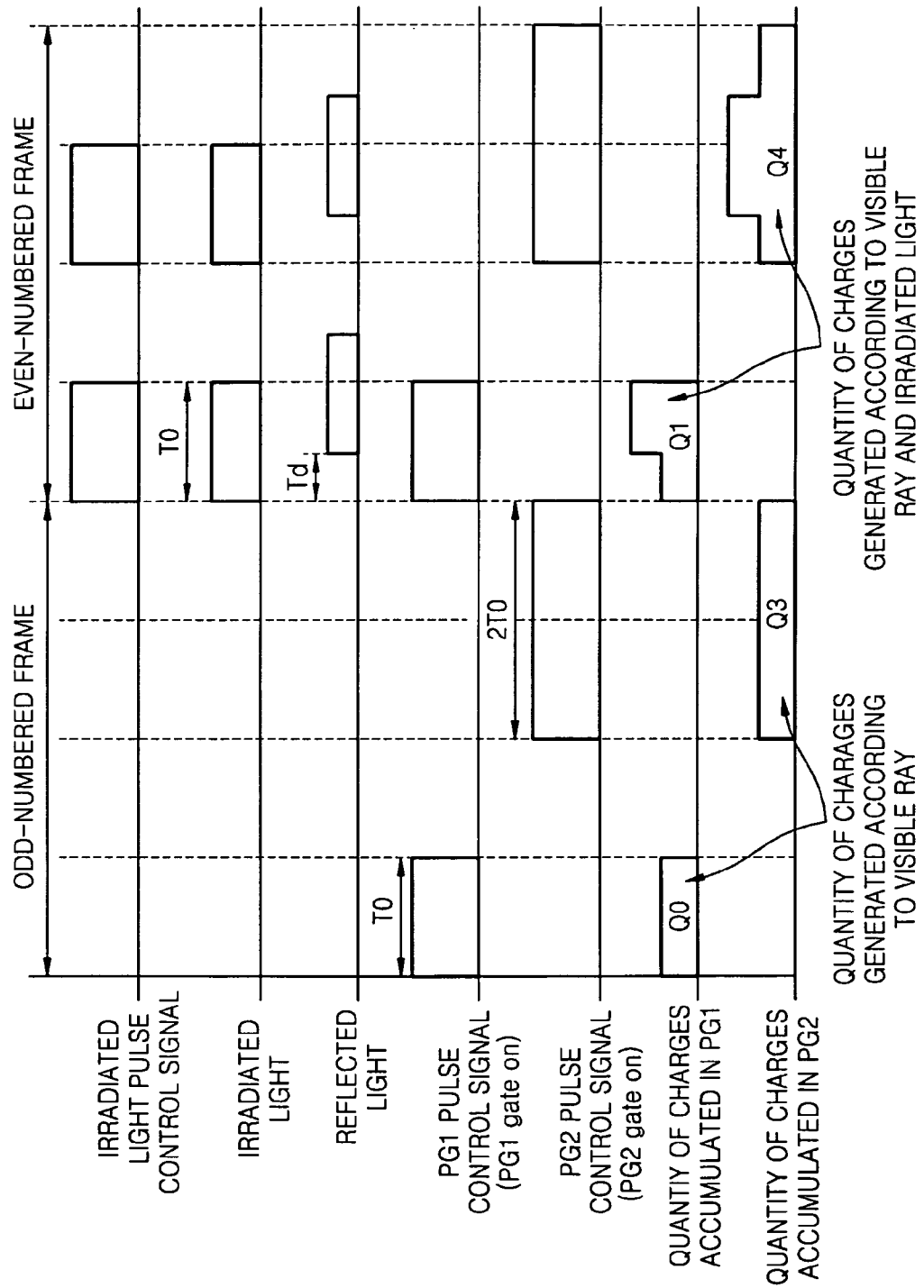
FIG. 4 illustrates pulse control signals applied to first photo-gates PG1 and second photo-gates PG2 of a color pixel array illustrated in FIG. 1 and the amount of charges accumulated according to the pulse control signals.

The pulse controller 115 applies an irradiated light pulse control signal to the light irradiating unit 120 and applies a PG1 pulse control signal and a PG2 pulse control signal to the color pixel array 138. Referring to FIG. 4, the pulse controller 115 does not apply the irradiated light pulse control signal having a pulse width corresponding to a time T0 to the light irradiating unit 120 when receiving a signal that represents that the current frame is an odd-numbered frame from the trigger pulse signal generator 110. In contrast, the pulse controller 115 does apply the irradiated light pulse control signal to the light irradiating unit 120 when receiving a signal that represents that the current frame is an even-numbered frame from the trigger pulse signal generator 110.

In addition, the pulse controller 115 applies pulse control signals to a sensor constituting the color pixel array 138. As illustrated in FIG. 4, the pulse controller 115 applies the PG1 pulse control signal having a pulse width of T0 to first photogates PG1 and applies the PG2 pulse control signal having a pulse width corresponding to a time 2T0 to second photogates PG2.

The light irradiating unit 120 is a light-emitting diode (LED) array or a laser device and applies a predetermined light to the target object 125 according to the irradiated light pulse control signal input from the pulse controller 115. The light irradiating unit 120 irradiates at least one of a near infrared ray and a near ultraviolet ray having wavelengths that can pass through the cut-off filter 135 and the color filter array 136 during the time T0 according to the irradiated light pulse control signal, as illustrated in FIG. 4. The near infrared ray is an infrared ray having a wavelength similar to that of a visible ray, in particular, a wavelength that can pass through both the cut-off filter 135, cutting off an infrared light and an ultraviolet light, and an R filter passing a red color component. The near infrared ray can have a wavelength of 700 nm through 750 nm. The near ultraviolet ray is an ultraviolet ray having a wavelength similar to that of the visible ray, in particular, a wavelength that can pass through both the cut-off filter 135 and a B filter passing a blue color component. The near ultraviolet ray can have a wavelength of 350 nm through 400 nm. An embodiment in which the light irradiating unit 120 irradiates the near infrared ray will now be explained.

The color value detector 130 receives only light having a wavelength required to generate the color image from among lights reflected from the target object 125, accumulates charges according to the received light and detects color values according to the accumulated charges. As described above, the color value detector 130 includes, for example, the lens 132, the filter unit 134 and the color sensor array 138.

The lens 132 refracts a light input thereto such that the input light is condensed to one point and transmits the refracted light to the filter unit 134. The lens 132 collects the near infrared ray reflected from the target object 125, and a visible ray from the target object 125, and transmits the collected light to the filter unit 134. The reflected near infrared ray has the same wavelength as that of the near infrared ray irradiated by the light irradiating unit 120 and the intensity of the reflected near infrared ray is proportional to a value obtained by multiplying the intensity of the near infrared ray irradiated by the light irradiating unit 120 by the reflectivity of the target object 125.

Figure 2:
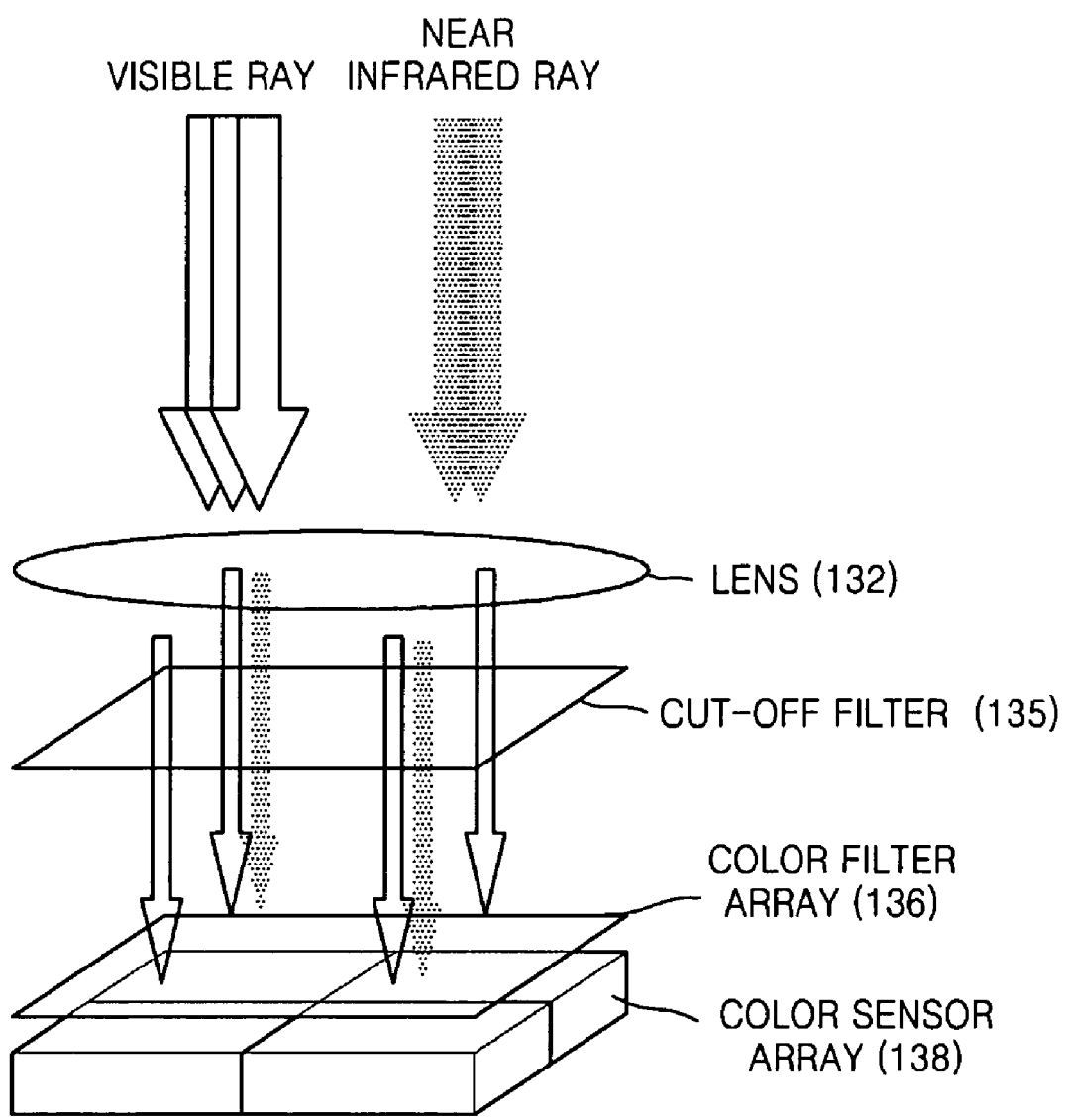
FIG. 2 illustrates an embodiment of a filter unit illustrated in FIG. 1.

The filter unit 134 passes only the light having the wavelength required to generate the color image from among the light condensed by the lens 132. The filter unit 134 includes the cut-off filter 135 and the color filter array 136, as illustrated in FIG. 2.

The cut-off filter 135 cuts off an infrared ray and an ultraviolet ray from among the light transmitted through the lens 132. The cut-off filter 135 can include an infrared cut-off filter and an ultraviolet cut-off filter or a single infrared and ultraviolet cut-off filter. The cut-off filter 135 is needed because the color pixel array 138 recognizes an infrared ray as a red color component of a visible ray, and recognizes an ultraviolet ray as a blue color component of the visible ray, so that a color image having a color different from the actual color of the target object 125 can be generated if the infrared ray or the ultraviolet ray is not cut off.

Figure 3A:
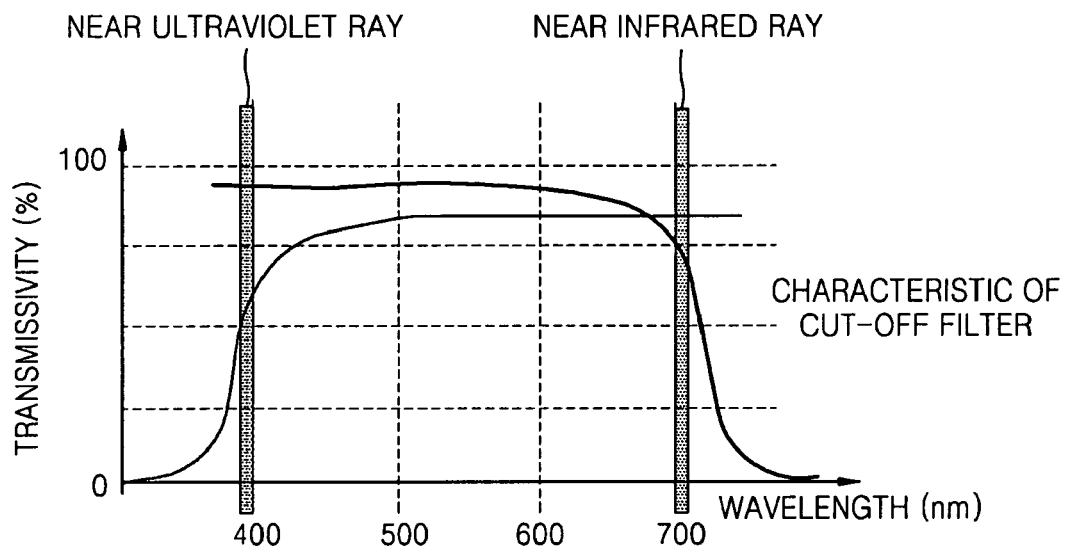
FIGS. 3A and 3B respectively illustrate transmissivities of a cut-off filter and a color filter array illustrated in FIG. 1 with respect to wavelength.

Wavelength characteristics of the cut-off filter 135 are illustrated in FIG. 3A. Referring to FIG. 3A, the cut-off filter 135 passes lights having wavelengths of approximately 400 nm through 700 nm, that is, the wavelength of the visible ray. In the current embodiment of the present invention, in particular, the cut-off filter 135 passes even a reflected light having a wavelength slightly longer than 700 nm, according to the characteristic of the cut-off filter 135.

Figure 3B:
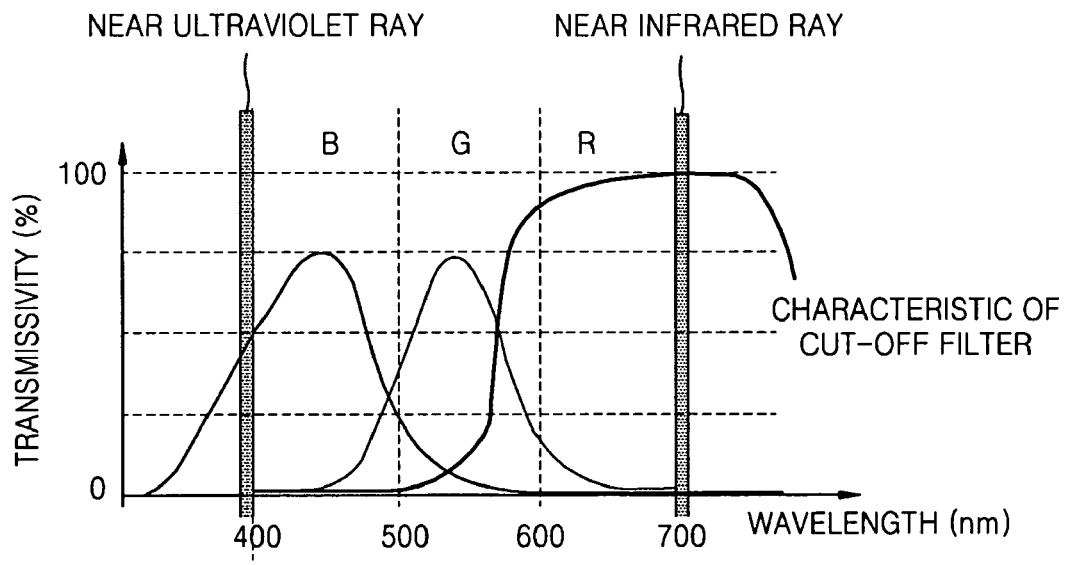

The color filter array 136 passes only one of red, green and blue color components of a light input thereto. A color filter array having a bayer pattern is used as the color filter array 136. The color filter array using the bayer pattern includes filters passing the green color component in 50%, filters passing the red color component in 25% and filters passing the blue color component in 25%, all of which are arranged in a lattice. Wavelength characteristic of the color filter array 136 are illustrated in FIG. 3B. FIG. 3B illustrates the relationship between transmissivity and wavelength for a B filter passing a blue color component, a G filter passing a green color component and an R filter passing a red color component. Referring to FIG. 3B, the R filter of the color filter array 136 passes a reflected light of a near infrared ray with the R color component of the visible ray, and the B filter of the color filter array 136 passes a near ultraviolet ray with the B color component of the visible ray.

The color pixel array 138 corresponds to pixels, receives light that has passed through the color filter array 136, generates charges according to the received light, and accumulates the generated charges. The color pixel array 138 provides color values corresponding to the accumulated charges to the color image generator 155. The color pixel array 138 includes a combination of a G color pixel that accumulates charges according to a G color component of the received light, an R color pixel that accumulates charges according to an R color component of the received light, and a B color pixel that accumulates charges according to a B color component of the received light. In particular, the R color pixel of the color pixel array 138, according to the current embodiment of the present invention, accumulates charges according to the R color component of the visible ray and charges according to a reflected light of a near infrared ray, and the B color pixel accumulates charges according to the B color component of the visible ray and charges according to a reflected light of a near ultraviolet ray. The R color pixel of the color pixel array 138 includes the first photo-gates PG1 and the second photo-gates PG2 that generate charges according to the R color component of the received light.

Referring to FIG. 4, the first photo-gates PG1 are turned on at a time when the PG1 pulse control signal applied by the pulse controller 115 rises, and thus charges begin to be accumulated in the first photo-gates PG1. The first photo-gates PG1 are turned off at a time when the PG1 pulse control signal applied by the pulse controller 115 falls, and thus accumulation of charges in the first photo-gates PG1 is stopped. That is, charges are accumulated in the first photo-gates PG1 during the time T0. However, only the red color component of the visible ray is received in odd-numbered frames, and thus charges generated according to the red color component of the visible ray are accumulated in the first photo-gates PG1 during the time T0. On the other hand, the red color component of the visible ray and a reflected light corresponding to a near infrared ray are received in even-numbered frames, and thus, the sum of charges generated according to the red color component of the visible ray and charges generated according to the reflected light is accumulated in the first photo-gates PG1 during the time T0. Here, it is assumed that the amount of charges accumulated in the first photo-gates PG1 in an odd-numbered frame is Q0 and the amount of charges accumulated in the first photo-gates PG1 in an even-numbered frame is Q1.

The second photo-gates PG2 are turned on at a time when the PG2 pulse control signal applied by the pulse controller 115 rises, and thus charges begin to be accumulated in the second photo-gates PG2. The second photo-gates PG2 are turned off at a time when the PG2 pulse control signal applied by the pulse controller 115 falls, and thus accumulation of charges in the second photo-gates PG2 is stopped. That is, charges are accumulated in the second photo-gates PG2 during a time 2T0. However, only the red color component of the visible ray is received in the odd-numbered frames, and thus charges generated according to the red color component of the visible ray are accumulated in the second photo-gates PG2 during the time 2T0. On the other hand, the red color component of the visible ray and the reflected light corresponding to a near infrared ray are received in the even-numbered frames, and thus the sum of charges generated according to the red color component of the visible ray and charges generated according to the reflected light is accumulated in the second photo-gates PG2 during the time 2T0. Here, it is assumed that the amount of charges accumulated in the second photo-gates PG2 in an odd-numbered frame is Q3 and the amount of charges accumulated in the second photo-gates PG2 in an even-numbered frame is Q4.

The charge amount calculator 145 calculates the amount of charges accumulated according to the reflected light from among the charges accumulated in the color pixel array 138. The color pixel array 138 accumulates charges according to the visible ray in an odd-numbered frame and accumulates charges according to the visible ray and the reflected light in an even-numbered frame, and thus the charge amount calculator 145 subtracts the amount of charges accumulated in the odd-numbered frame from the amount of charges accumulated in the even-numbered frame so as to calculate the amount of charges accumulated according to the reflected light.

More specifically, the charge amount calculator 145 calculates the amount of charges accumulated in the first photo-gates PG1 according to the reflected light, Q2, by subtracting Q0 from Q1. That is, the charge amount calculator 145 calculates Q2=Q1−Q0. Furthermore, the charge amount calculator 145 calculates the amount of charges accumulated in the second photo-gates according to the reflected light, Q5, by subtracting Q3 from Q4. That is, the charge amount calculator 145 calculates Q5=Q4−Q3.

The depth image generator 150 calculates a distance between the image generating apparatus 10 and the target object 125, using Q2 and Q5, calculated by the charge amount calculator 145, and generates a depth image according to the distance. A method of calculating the distance between the image generating apparatus 10 and the target object 125 will now be explained with reference to FIG. 5.

The distance between the image generating apparatus 10 and the target object 125 can be calculated using Q2. Here, a delay time td decreases as the distance between the image generating apparatus 10 and the object 125 decreases, and thus Q2 increases. That is, Q2 is inversely proportional to the distance between the image generating apparatus 10 and the target object 125. In addition, Q2 is directly proportional to the reflectivity of the target object 125 because the intensity of the reflected light is directly proportional to the reflectivity of the target object 125. Accordingly, the distance between the image generating apparatus 10 and the target object 125 can be easily calculated using only Q2 if the reflectivity of the target object 125 is known. However, the reflectivity of the target object 125 cannot be known in general, and thus the depth image generator 150 illustrated in FIG. 1 calculates distance between the image generating apparatus 10 and the target object 125 using Q2 and Q5.

Figure 5:
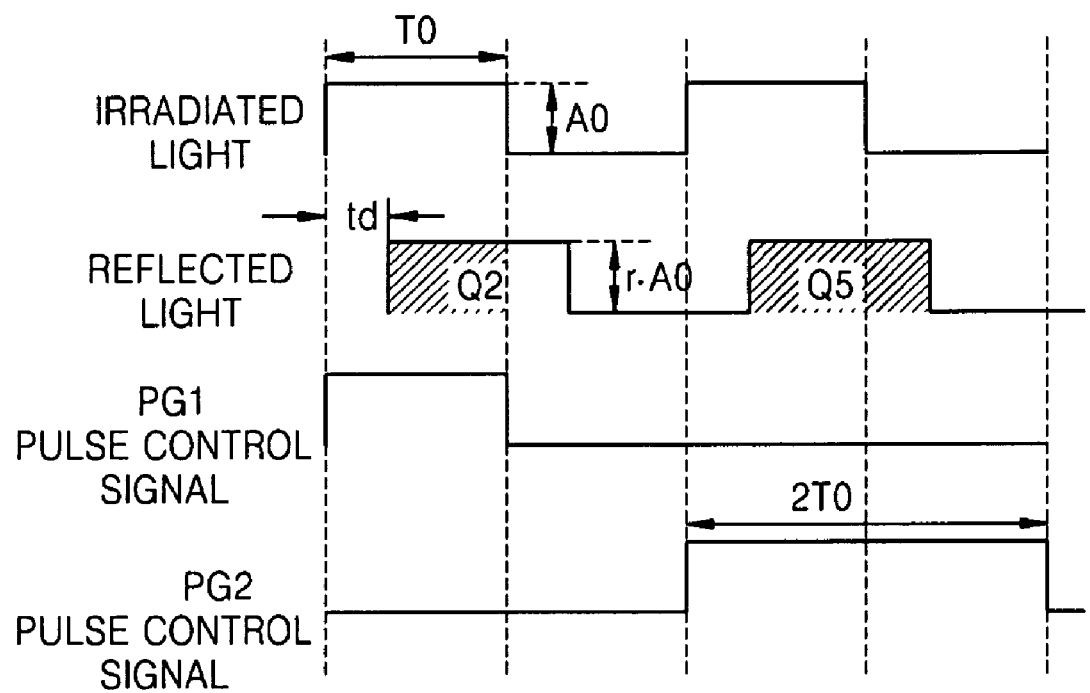
FIG. 5 illustrates the amount of charges accumulated in the first photo-gates PG1 and the second photo-gates PG2 according to a reflected light used by a charge amount calculator illustrated in FIG. 1.

As illustrated in FIG. 5, when the intensity of the near infrared ray irradiated by the light irradiating unit 120 is A0 and the reflectivity of the target object 125 is r, Q2 is proportional to a value obtained by subtracting the delay time td from a time T0 by r*A0 corresponding to the intensity of the reflected light, as represented by Equation 1 below.

$$Q2 \propto (T0-td) \times r \times A0 \qquad \text{Equation 1:}$$

In addition, Q5 is proportional to a value obtained by multiplying the time T0 when the near infrared ray is irradiated by r*A0 corresponding to the intensity of the reflected light arriving at a pixel, as represented by Equation 2 below.

$$Q5 \propto T0 \times r \times A0 \qquad \text{Equation 2:}$$

Equations 3 and 4 can be derived from Equations 1 and 2.

$$\frac{Q2}{Q5} = \frac{T0-td}{T0} \qquad \text{Equation 3:}$$

$$td = (Q5-Q2)/Q5 \times T0 \qquad \text{Equation 4:}$$

Accordingly, the delay time td, that is, a time from when the near infrared ray is irradiated, to when the reflected light arrives at the color pixel array 138, can be calculated by subtracting Q2 from Q5, dividing the subtraction result by Q5 and multiplying the division result by T0 during which the near infrared ray is irradiated. The depth image generator 138 divides the delay time td by 2 and multiplies the division result by the velocity of light, c. That is, the depth image generator 138 calculates 1/2×c×td so as to calculate the distance between the image generating apparatus 10 and the target object 125 illustrated in FIG. 1 and generates the depth image according to the calculated distance.

The color image generator 155 generates a color image using Q0 and Q3 corresponding to color values detected by the color pixel array 138 in the odd-numbered frames. In this case, the color image can be generated by summing up Q0 and Q3.

As described above, the image generating apparatus according to the current embodiment of the present invention requires only a single color pixel array because the color pixel array 138 receives visible rays and near infrared rays together. An image generating method using a beam splitter transmits visible rays through the beam splitter such that the visible rays reach a color pixel array to generate a color image and refract near infrared rays using the beam splitter such that the near infrared rays arrive at a distance pixel array to generate a depth image. The beam splitter is a refracting mirror or other optical devices that refract some rays and transmits other rays according to the wavelength. However, this method requires at least two pixel arrays and increases the volume of an image generating apparatus because the beam splitter is used. Furthermore, an angle between the beam splitter and the pixel arrays must be accurately set in order to make optical axes of the visible ray and the near infrared ray correspond to each other. Accordingly, the current embodiment of the present invention can easily construct an image sensor device having a small size.

In the current embodiment of the present invention, all pixels constituting the color pixel array 138 contribute to the generation of a color image. However, in a method using a bayer pattern color sensor in which half of the green pixels are replaced with depth measuring pixels, the resolution of a color image is deteriorated compared to that of a color image obtained by the original bayer pattern color pixel and colors are distorted. Furthermore, the pixels measuring the depth correspond to a quarter of the total pixels of the color sensor, and thus the resolution of a depth image also decreases. However, the pixels constituting the color pixel array 138 are all used to generate a color image in the current embodiment of the present invention, and thus the resolution of the color image is not decreased. Furthermore, a depth image is generated using B pixels and R pixels so that the resolution of the depth image can be improved to half the total resolution.

Figure 6:
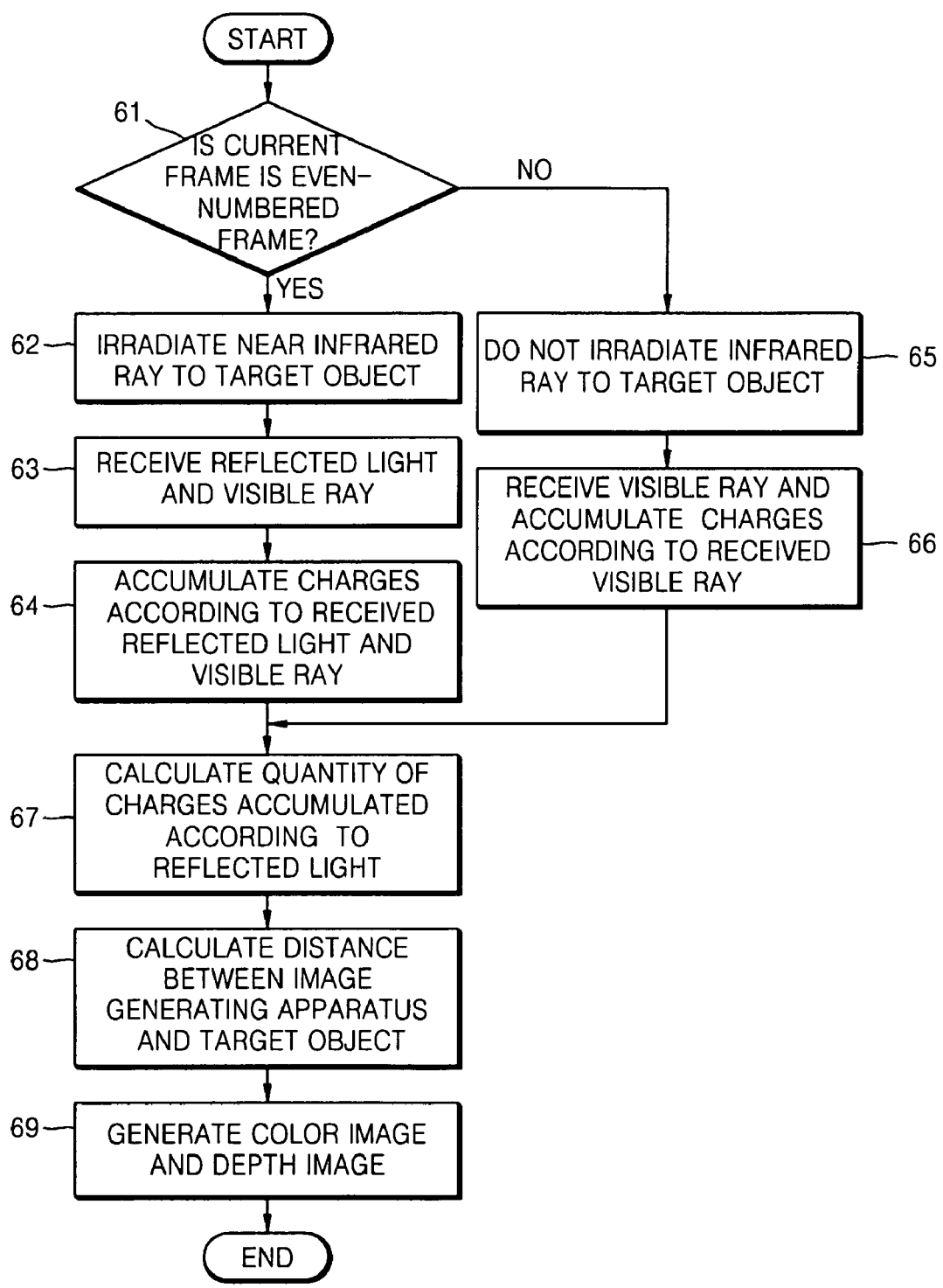
FIG. 6 illustrates an image generating method, according to an embodiment of the present invention.

FIG. 6 illustrates an image generating method, according to an embodiment of the present invention. Referring to FIG. 6, the image generating method includes operations time-serially processed in the image generating apparatus illustrated in FIG. 1. Accordingly, the aforementioned description with respect to the image generating apparatus illustrated in FIG. 1 is also applied to the image generating method illustrated in FIG. 6.

Referring to FIGS. 1 and 6, the image generating apparatus 10 checks whether a current frame is an even-numbered frame or an odd-numbered frame in operation 61. The image generating apparatus 10 irradiates a predetermined light to a target object for a time T0 when the current frame is an even-numbered frame in operation 62. The predetermined light irradiated to the target object can be at least one of a near infrared ray and a near ultraviolet ray that can pass through both an infrared and ultraviolet cut-off filter and a color filter array. In the current embodiment of the present invention, the predetermined light is the near infrared ray.

The image generating apparatus 10 passes a light having a wavelength required to generate a color image from among lights reflected from the target object in operation 63. Specifically, the image generating apparatus 10 passes a reflected light, obtained in a manner that the near infrared ray irradiated in operation 62 is reflected from the target object, and a visible ray from the target object. The reflected light has the same wavelength as that of the near infrared ray and the intensity of the reflected light is proportional to a value obtained by multiplying the intensity of the near infrared ray by the reflectivity of the target object.

The image generating apparatus 10 detects information according to the reflected light and the visible light received in operation 64. Referring to FIG. 4, the image generating apparatus 10 turns on the first photo-gates PG1 for the time T0 from when the near infrared ray is irradiated to accumulate charges in the first photo-gates PG1. The image generating apparatus 10 turns off the first photo-gates PG1 after the time T0 to stop the accumulation of charges such that charges are accumulated in the first photo-gates PG1 during the time T0. Here, the amount of charges accumulated in the first photo-gates PG1 in an even-numbered frame is referred to as Q1. The image generating apparatus 10 turns on the second photo-gates PG2 for a time 2T0 from when the near infrared ray is irradiated again by the light irradiating unit 120 after the first photo-gates PG1 are turned off to accumulate charges in the second photo-gates PG2. The image generating apparatus 10 turns off the second photo-gates PG2 after the time 2T0 to stop the accumulation of charges such that charges are accumulated in the second photo-gates PG2 for the time 2T0. Here, the amount of charges accumulated in the second photo-gates PG2 in the even-numbered frame is referred to as Q4.

In operation 65, the image generating apparatus 10 does not irradiate the near infrared ray to the target object when it is checked that the current frame is an odd-numbered frame in operation 61. The near infrared ray can be irradiated to the target object at a specific interval through operations 61, 62 and 65.

The image generating apparatus 10 passes the visible ray from the target object, which has a wavelength required to generate the color image, from among lights reflected from the target object and detects information according to the visible ray. Referring to FIG. 4, the image generating apparatus 10 turns on the first photo-gates PG1 for the time T0 to accumulate charges in the first photo-gates PG1. The image generating apparatus 10 turns off the first photo-gates PG1 after the time T0 to stop the accumulation of charges such that charges are accumulated in the first photo-gates PG1 during the time T0. Here, the amount of charges accumulated in the first photo-gates PG1 in the odd-numbered frame is referred to as Q0. The image generating apparatus 10 turns on the second photo-gates PG2 for the time 2T0 to accumulate charges in the second photo-gates PG2. The image generating apparatus 10 turns off the second photo-gates PG2 after the time 2T0 to stop the accumulation of charges such that charges are accumulated in the second photo-gates PG2 for the time 2T0. Here, the amount of charges accumulated in the second photo-gates PG2 in the odd-numbered frame is referred to as Q3.

The image generating apparatus 10 calculates the amount of charges accumulated according to the reflected light in operation 67. Here, the image generating apparatus 10 subtracts the amount of charges accumulated in operation 64 from the amount of charges accumulated in operation 66 to calculate the amount of charges accumulated according to the reflected light. Specifically, the image generating apparatus 10 subtracts Q0 from Q1 to calculate the amount of charges accumulated in the first photo-gates PG1 according to the reflected light and subtracts Q3 from Q4 to calculate the amount of charges accumulated in the second photo-gates PG2 according to the reflected light. Here, the amount of charges accumulated in the first photo-gates PG1 according to the reflected light is referred to as Q2 and the amount of charges accumulated in the second photo-gates PG2 according to the reflected light is referred to as Q5.

The image generating apparatus 10 calculates a distance between the image generating apparatus 10 and the target object using Q2 and Q5 in operation 68. The distance between the image generating apparatus 10 and the target object is obtained from $1/2 \times c \times td$. Since $td=(Q5-Q2) \div Q \times T0$ from Equations 1, 2, 3 and 4, the distance between the image generating apparatus 10 and the target object corresponds to $1/2 \times c \times \{(Q5-Q2) \div Q5 \times T0\}$. In operation 69, the image generating apparatus 10 generates the color image using the information detected in operation 66, that is, Q0 and Q3, and generates the depth image using the distance calculated in operation 68.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), for example. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image generating method comprising:
   irradiating a light with a predetermined wavelength to a target object at a predetermined interval;
   passing a light having a wavelength required to generate a color image from among lights reflected from the target object and detecting color values according to the passed light;
   generating a depth image of the target object using color values detected during a period in which the light with the predetermined wavelength is irradiated; and
   generating the color image of the target object using color values detected during a period other than the period in which the light with the predetermined wavelength is irradiated.

2. The image generating method of claim 1, wherein the generating of the depth image comprises generating the depth image of the target object using at least one of red color values and blue color values detected during the period in which the light with the predetermined wavelength is irradiated.

3. The image generating method of claim 1, wherein the detecting of the color values comprises cutting off an infrared ray and an ultraviolet ray from among the lights reflected from the target object so as to pass only the light having the wavelength required to generate the color image and detecting the color values according to the passed light, and the light irradiated to the target object is not the infrared ray and ultraviolet ray and has the same wavelength as the wavelength required to generate the color image.

4. The image generating method of claim 3, wherein the detecting of the color values comprises passing the light having the wavelength required to generate the color image from among the lights reflected from the target object, accumulating charges according to the passed light, and detecting color values from the accumulated charges.

5. The image generating method of claim 1, wherein the generating the depth image of the target object comprises:
   calculating color values according to the irradiated light using differences between the color values detected during the period in which the light with the predetermined wavelength is irradiated and the color values detected during the period other than the period in which the light with the predetermined wavelength is irradiated; and
   calculating the depth of the target object using the calculated color values to generate the depth image according to the calculated depth.

6. A computer readable recording medium storing a program for executing the image generating method of claim 1.

7. An image generating apparatus comprising:
   a light irradiating unit irradiating a light with a predetermined wavelength to a target object at a predetermined interval;
   a color value detector passing a light having a wavelength required to generate a color image from among lights reflected from the target object and detecting color values according to the passed light;
   a depth image generator generating a depth image of the target object using color values detected during a period in which the light with the predetermined wavelength is irradiated; and
   a color image generator generating the color image of the target object using color values detected during a period other than the period in which the light with the predetermined wavelength is irradiated.

8. The image generating apparatus of claim 7, wherein the depth image generator generates the depth image of the target object using at least one of red color values and blue color values detected during the period in which the light with the predetermined wavelength is irradiated.

9. The image generating apparatus of claim 7, wherein the color value detector comprises a color filter array cutting off an infrared ray and an ultraviolet ray from among the lights reflected from the target object so as to pass only the light having the wavelength required to generate the color image, and a color pixel array detecting the color values according to the passed light, and the light irradiated to the target object is not the infrared ray and ultraviolet ray and has the same wavelength as the wavelength required to generate the color image.

10. The image generating apparatus of claim 9, wherein the color pixel array accumulates charges according to the passed light and detects color values from the accumulated charges.

11. The image generating apparatus of claim 7, wherein the depth image generator calculates color values according to the irradiated light using differences between the color values detected during the period in which the light with the predetermined wavelength is irradiated and the color values detected during the period other than the period in which the light with the predetermined wavelength is irradiated and calculates the depth of the target object using the calculated color values to generate the depth image according to the calculated depth.

* * * * *